(12) United States Patent
Hirata et al.

(10) Patent No.: US 7,910,198 B2
(45) Date of Patent: *Mar. 22, 2011

(54) RESINOUS POROUS ARTICLE AND METHOD FOR PRODUCTION THEREOF

(75) Inventors: Masakazu Hirata, Kuwana (JP); Hideyuki Tsutsui, Kuwana (JP)

(73) Assignee: NTN Corporation, Osaka (JP)

( * ) Notice: Subject to any disclaimer, the term of this patent is extended or adjusted under 35 U.S.C. 154(b) by 448 days.

This patent is subject to a terminal disclaimer.

(21) Appl. No.: 11/578,167

(22) PCT Filed: Apr. 14, 2005

(86) PCT No.: PCT/JP2005/007216
§ 371 (c)(1),
(2), (4) Date: Oct. 31, 2006

(87) PCT Pub. No.: WO2005/103128
PCT Pub. Date: Nov. 3, 2005

(65) Prior Publication Data
US 2008/0032112 A1    Feb. 7, 2008

(30) Foreign Application Priority Data

| Apr. 23, 2004 | (JP) | P2004-128896 |
| Apr. 23, 2004 | (JP) | P2004-128897 |
| Apr. 28, 2004 | (JP) | P2004-132454 |
| Jul. 20, 2004 | (JP) | P2004-211030 |
| Dec. 28, 2004 | (JP) | P2004-379104 |

(51) Int. Cl.
*B32B 5/16* (2006.01)
*C08J 9/26* (2006.01)

(52) U.S. Cl. ............... 428/308.4; 428/305.5; 428/306.6; 428/315.5; 428/315.7; 521/61; 521/63; 384/527

(58) Field of Classification Search ............... 428/317.9, 428/306.6, 308.4, 305.5, 315.5, 315.7; 521/61, 521/63; 384/527
See application file for complete search history.

(56) References Cited

U.S. PATENT DOCUMENTS

| 4,196,070 A | * | 4/1980 | Chao et al. .................... 204/266 |
| 4,226,886 A | * | 10/1980 | Lakes ......................... 428/315.7 |
| 4,623,472 A | * | 11/1986 | Jamison et al. ............... 508/100 |
| 5,185,111 A | * | 2/1993 | Lazar ............................ 264/49 |
| 2001/0009716 A1 | | 7/2001 | Taguchi et al. |
| 2004/0058142 A1 | * | 3/2004 | Pekala ........................ 428/317.9 |
| 2007/0232502 A1 | * | 10/2007 | Tsutsui et al. ................ 508/104 |
| 2008/0085070 A1 | * | 4/2008 | Hirata et al. .................. 384/470 |
| 2008/0260980 A1 | * | 10/2008 | Hirata et al. ................ 428/35.7 |

FOREIGN PATENT DOCUMENTS

| JP | 61-006429 | 1/1986 |
| JP | 61-008107 | 1/1986 |
| JP | 06-041569 | 2/1994 |
| JP | 09-076371 | 3/1997 |
| JP | 10-316794 | 12/1998 |
| JP | 11-166541 | 6/1999 |
| JP | 2000-071243 | 3/2000 |
| JP | 2000-071244 | 3/2000 |
| JP | 2000-191820 | 7/2000 |
| JP | 2001-002825 | 1/2001 |
| JP | 2002-060534 | 2/2002 |
| JP | 2002-129183 | 5/2002 |
| JP | 2002-194131 | 7/2002 |
| JP | 2002-322310 | 8/2002 |
| JP | 2003-342410 | 3/2003 |

OTHER PUBLICATIONS

International Search Report, Jun. 27, 2005.

* cited by examiner

*Primary Examiner* — Hai Vo
(74) *Attorney, Agent, or Firm* — Hedman & Costigan, P.C.; James V. Costigan

(57) ABSTRACT

The present invention provides a resinous porous article having a high interconnected hole porosity and capable of retaining a large amount of a lubricating oil and does not rust iron and steel, even though an unextracted portion of a pore-forming substance bleeds out when the resinous porous article is used as parts which contact a metal portion or the like and a method of producing the resinous porous article. The resinous porous article is formed by a producing method of molding a resin containing the pore-forming substance into a molding, and extracting the pore-forming substance from the molding with a solvent which does not dissolve the resin therein. The resinous porous article has an interconnected hole porosity not less than 30%. The pore-forming substance consists of an alkali compound.

10 Claims, 2 Drawing Sheets

RESINOUS POROUS ARTICLE AND METHOD FOR PRODUCTION THEREOF

TECHNICAL FIELD

The present invention relates to a resinous porous article and a method of producing the resinous porous article and more particularly to a homogeneous resinous porous article in which diameters of interconnected holes and distribution thereof are uniform and to the resinous porous article impregnated with lubricating oil (in the present invention, hereinafter referred to as resinous oil-retaining article), and a method of producing them.

BACKGROUND ART

As one of methods of improving the frictional wear property of a resinous article, so-called "gan-pla" (lubricating oil-containing plastic) of adding lubricating oil thereto is known. In this method, the resin and the lubricating oil are melted, kneaded, pelletized to obtain a mixture thereof having a certain configuration, and injection-molded or extrusion-molded. In this method, to prevent deterioration of the injection moldability, the amount of the lubricating oil which can be added to the resin is up to about 10 vol %. Because the resin and the lubricating oil are melted and kneaded, the resinous article has a high uniformity and oil-retaining performance, and the lubricating oil little bleeds out to the surface thereof. Therefore the function of the resinous article in supplying the lubricating oil is insufficient. Further when the resinous article is used as a sliding bearing, a sufficient frictional performance is not obtained in a region in which a PV value which is the product of a load (P) and a sliding speed (V) is high.

Heretofore as an oil-containing resin, developed to solve the above-described problem, which is a mixture of resin and lubricating oil to be molded into a predetermined configuration, the composition containing the ultra-high-molecular-weight polyethylene and the grease is disclosed (see patent document 1). Because the grease of the composition prevents the lubricating oil from flowing, the lubricating oil can be contained in the resin at not less than 50 vol %. The amount of bleeding of the lubricating oil to the surface of the composition is larger than the amount of bleeding of the lubricating oil to the surface of the resinous article formed by the gan-pla.

There is disclosed the oil-containing resin to which the oil guide material is added (see patent documents 2 through 4); the lubricating oil retained by the porous silica is mixed with the synthetic resin to obtain the oil-containing resin (see patent document 5). These oil-containing resins are intended to successively supply the surface of the resin with the lubricating oil. Owing to the help of the guide article and the porous silica, the amount of the lubricating oil that can be contained in the resin is increased to about 20 vol %.

A method of impregnating the resin molded by sintering it into a predetermined configuration with the lubricating oil is disclosed (see patent documents 6 and 7). In consideration of closest packing and compression in a molding step, a porosity which is a substantial ratio of a void is up to 30%. The impregnating oil can be contained in the void.

In the patent document 1, although a sufficient amount of the oil is secured, the composition is of an incorporating type of mixing the resin and the lubricating agent with each other. Therefore the composition has a high oil-retaining performance and a low utilization efficiency of the added lubricating oil. The incorporating type has a problem that when the amount of the lubricating oil is large, the mechanical strength of the oil-containing resinous article becomes low.

In the oil-containing resins disclosed in the patent documents 2, 3, 4, and 5, as described above, owing to the oil guide materials and the porous silica, the amount of the lubricating oil in the resin is increased up to 20 vol %. Further owing to the addition of the reinforcing agent, a decrease of the mechanical strength of the oil-containing resins can be restrained. But when the oil-containing resins are applied to a retainer of a bearing to lubricate it with only the oil in the resin, there occur problems that the amount of the lubricating oil is insufficient and that the bleeding speed thereof to the surface is low.

Further the methods disclosed in the patent documents 1 through 5 are intended to shape the kneaded resin and lubricating oil into predetermined configurations. Therefore the methods have a limitation in the combination of the resin and the lubricating oil and are unapplicable to a wide range of use.

On the other hand, in the methods disclosed in patent documents 6 and 7, the degree of freedom in the combination of the resin and the lubricating oil is increased. But the resin which can be actually molded by sintering it is limited to ultra-high-molecular-weight polyethylene and polyimide resin. As described above, the substantial porosity is up to 30%. Thus when the oil-containing resins are applied to the retainer of the bearing to lubricate it with only the oil in the resin, the amount of the lubricating oil is insufficient. Thus the oil-containing resins are incapable of satisfying a recent-demand for a long life.

A desalting method is known as a method of allowing adjustment of the porosity and production of an inexpensive resinous porous article. The desalting method is the method of producing the resinous porous article by molding a material composed of resin or rubber to which a powdery pore-forming substance such as sodium chloride and sodium sulfate is added as a solid molding containing the pore-forming substance, eluting the pore-forming substance by cleaning the obtained solid molding with water, and forming pores at a portion where the pore-forming substance has been present.

The following methods of producing the resinous porous article having a high porosity by using the desalting method are known: The method, of producing the resinous porous article, which is carried out by using the pore-forming substance which is solid at a normal temperature and melts at the molding temperature of the polymeric substance forming the skeleton of the resinous porous article and is thus capable of being present in a liquid state (see patent document 8); the method of forming pores by molding the material composed of a particulate pore-forming substance dispersed in the polymeric substance at the temperature at which a part of the particulate pore-forming substance dissolves to form the porous article and washing the porous article with the solvent not dissolving the polymeric substance therein but dissolves the pore-forming substance therein (see patent document 9); and the method of producing the porous article made of polyolefin resin having interconnected bubbles (see patent document 10).

To facilitate the separation of an extraction and reuse of a material, the pore-forming substance consisting of water-soluble powder is extracted by using hot water (see patent document 11).

Sodium chloride, ammonium chloride, sodium sulfate, sodium nitrate, potassium sulfate, magnesium sulfate, and calcium chloride disclosed as the pore-forming substance in the above-described patent documents are comparatively water-soluble, inexpensive, and easily available. Thus they are effective as the pore-forming substance to be used in the production of the resinous porous article having a large pore diameter. But in forming fine pores, it is difficult to completely dissolve and extract the pore-forming substance.

Therefore, an unextracted portion of the pore-forming substance bleeds during operation and may rust the iron and steel, when the resinous porous article is used as parts which contact iron and steel. Therefore when the resinous porous article is impregnated with the lubricating oil to use it as a resinous oil-retaining article, its use as a rolling bearing, a sliding bearing, and the like around which the iron and steel is present is inappropriate.

In the desalting method, the size of the powdery pore-forming substance determines the size of the pore unlike a pore-forming method using a foaming agent. Thus it is necessary to control the size of the powdery pore-forming substance. It is also necessary to control the diameter of particles of the pore-forming substance according to the diameter of the particles thereof or the kind of the article thereof by classifying the particles thereof. Thus the resinous porous article produced by the desalting method is expensive.

Patent document 1: Japanese Patent Application Laid-Open No. 6-41569
Patent document 2: Japanese Patent Application Laid-Open No. 11-166541
Patent document 3: Japanese Patent Application Laid-Open No. 2000-71243
Patent document 4: Japanese Patent Application Laid-Open No. 2000-71244
Patent document 5: Japanese Patent Application Laid-Open No. 2002-129183
Patent document 6: Japanese Patent Application Laid-Open No. 61-6429
Patent document 7: Japanese Patent Application Laid-Open No. 9-76371
Patent document 8: Japanese Patent Application Laid-Open No. 2001-2825
Patent document 9: Japanese Patent Application Laid-Open No. 2002-194131
Patent document 10: Japanese Patent Application Laid-Open No. 2002-60534
Patent document 11: Japanese Patent Application Laid-Open No. 2002-322310

DISCLOSURE OF THE INVENTION

Problem to be Solved by the Invention

The present invention has been made to solve the above-described problems. It is an object of the present invention to provide a resinous porous article having a high interconnected hole porosity and capable of retaining a large amount of a lubricating oil; and a resinous oil-retaining article, composed of the resinous porous article impregnated with the lubricating oil, which contains a large amount of the oil, is excellent in the use efficiency of the lubricating oil, and allows the resin and the lubricating oil to be combined with each other according to a use and a specification. Particularly the present invention is intended to provide a resinous oil-retaining article which is used as parts which contact a metal portion and does not rust iron and steel, even though an unextracted portion of a pore-forming substance contained in the oil-retaining article bleeds out during operation. It is a further object of the present invention to provide a method of producing the resinous porous article in which the diameters of pores forming interconnected holes and the distribution thereof are uniform and particularly the diameters of the pores are not more than 100 μm, even though the size of the powdery pore-forming substance is not controlled.

In the present invention, the interconnected hole means a void which is formed by coalescence of a plurality of pores without enlargement of the diameters thereof and is continuous with the surface of resin.

In the present invention, the definition of the interconnected hole porosity is almost the same as that of the above-described porosity and is the ratio of the total volume of interconnected holes to the volume of a resinous article.

Means for Solving the Problems

A resinous porous article of the present invention has interconnected holes. The interconnected holes are formed by molding a resin containing a pore-forming substance into a molding, and extracting the pore-forming substance from the molding with a solvent which does not dissolve the resin and dissolves the pore-forming substance.

The pore-forming substance has a higher melting point than a temperature at which the resin is molded. The pore-forming substance is water-soluble.

The interconnected hole porosity of the resinous porous article is not less than 30%.

The pore-forming substance is an alkali compound.

The alkali compound is at least one metal salt selected from among an organic alkali metal salt and an organic alkali earth metal salt.

The alkali compound is at least one compound selected from among sodium benzoate, sodium acetate, sodium sebacate, sodium triphosphate, sodium pyrophosphate, and potassium carbonate.

In the resinous porous article, oil is impregnated into the interconnected hole. That is, the resinous porous article is used as a resinous oil-retaining article.

The above-described oil consists of a lubricating oil. Specifically, not less than 60% of a total amount of the lubricating oil can be utilized as the lubricating oil.

A method of the present invention of producing a resinous porous article, comprising the steps of adding a pore-forming substance to a resin; molding the resin containing the pore-forming substance into a molding; and extracting the pore-forming substance from the molding with a solvent which does not dissolve the resin and dissolves the pore-forming substance.

The step of mixing the pore-forming substance with the resin comprises the step of dispersing resinous powder which does not dissolve in a solvent in which the pore-forming substance dissolves; and the step of removing the solvent from the dispersion solution, whereby a mixture of the pore-forming substance and the resinous powder is formed.

The solvent used in the dispersing step is the same as the solvent used in the step of extracting the pore-forming substance.

An average diameter of the pore-forming substance is in a range of 0.001 μm to 100 μm, after the step of removing the solvent finishes.

Effect of the Invention

Because the resinous porous article of the present invention has a high interconnected hole porosity, the resinous porous article can be preferably utilized for an oil-retaining article and the like. The resinous oil-retaining article obtained by impregnating the above-described resinous porous article with the lubricating oil has an interconnected hole porosity not less than 30%. Not less than 60% of the whole amount of the lubricating oil which has impregnated the resinous porous article can be utilized as the lubricating oil. Thus the resinous oil-retaining article contains the oil at a high percentage and is excellent in the oil utilization efficiency and hence provides lubricating performance for a long time. Further because the molded resinous porous article is impregnated with the lubricating oil, the lubricating oil can be arbitrarily selected according to a use and a specification without considering a resin-molding condition and the like.

As the pore-forming substance which is used in producing the resinous porous article, not an acidic salt, but an alkali salt, particularly an organic alkali metal salt serving as a rust preventive agent is used. Thereby in using the resinous oil-retaining article for a bearing and the like around which iron and steel are present, it is possible to prevent the iron and steel from being corroded, even though the pore-forming substance remaining in the oil-retaining article bleeds.

The method of the present invention of producing the resinous porous article includes the steps of adding the pore-forming substance to the resin; molding the resin containing the pore-forming substance into the molding; and extracting the pore-forming substance from the molding with the solvent which does not dissolve the resin. Therefore it is possible to produce the resinous porous article having a high interconnected hole porosity.

In the production of the resinous porous article of the present invention, the step of adding the pore-forming substance to the resin includes the step of dispersing the resinous powder which does not dissolve in the solvent in which the pore-forming substance dissolves to form the dispersion solution; and the step of removing the solvent which removes the solvent from the dispersion solution to obtain the mixture of the pore-forming substance and the resinous powder. Therefore it is possible to obtain the homogeneous resinous porous article having interconnected holes which are substantially constant in diameters and distributed substantially uniformly.

The diameter of the interconnected hole means the diameter of a section of a void vertical to a direction in which voids are interconnected with each other.

EXPLANATION OF REFERENCE NUMERALS AND SYMBOLS

Figure 1:
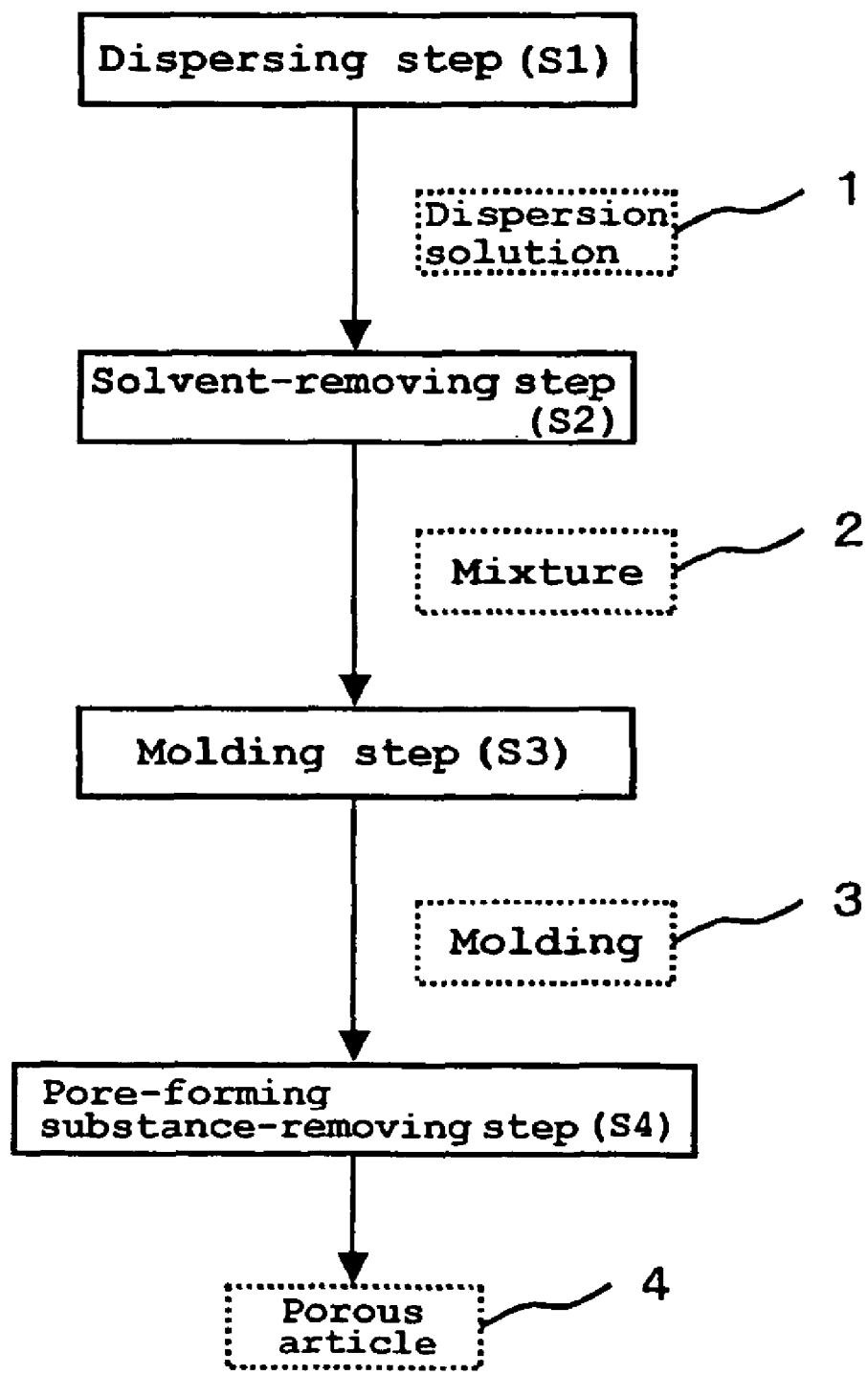
FIG. 1 is flowchart of a method of the present invention of producing a resinous porous article.

1: dispersion solution
2: mixture
3: molding
4: resinous porous article

BEST MODE FOR CARRYING OUT THE INVENTION

A resinous porous article of the present invention is obtained by molding a resin containing a pore-forming substance, particularly an alkali pore-forming substance into a molding, thereafter extracting the pore-forming substance from the molding with a solvent which does not dissolve the resin. By using an organic alkali metal salt as the pore-forming substance, the resinous porous article can be preferably utilized for a bearing and the like around which iron and steel are present even though the pore-forming substance is not completely dissolved and extracted, because the pore-forming substance acts as a rust preventive agent.

The definition of the porosity of interconnected hole, the resin composing the resinous porous article of the present invention, the pore-forming substance, the molding method, and the extracting method are described in detail below.

As a form of most densely packing a sphere by a point contact, a face-centered cubic lattice and a hexagonal closest packing are known. The packing percentage thereof is calculated by (volume of sphere÷volume of circumscribed cube)÷(height of equilateral triangle÷base)÷(height of regular tetrahedron÷one side) and is both 74%. The porosity defined as (100−packing percentage) is 26%.

The above-described computation is made on the assumption that spheres having the same size are packed. When spheres having a plurality of sizes are packed, the packing percentage is higher and the porosity becomes lower than those of the hexagonal closest packing.

When powdery spherical resin particles are compression molded and then sintered, point contact is impossible but the spherical resin particles deform and make face contacts. Therefore the packing percentage is higher and the porosity becomes lower than those of the hexagonal closest packing. Thus the porosity of the conventional sintered resinous article is up to 20%.

The definition of the interconnected hole porosity used in the present invention is almost the same as that of the above-described porosity and means the porosity when pores are continuous. That is, the interconnected hole porosity means the ratio of the total volume of the pores continuous with one another from the surface of resin to the volume of the resinous article.

More specifically, the interconnected hole porosity is calculated by the method shown by an equation (1) in "numerical equation 1".

[Before cleaning]    [After cleaning]    [Numerical Equation 1]

| $V, \rho, W$ | | $V_3, W_3$ | |
|---|---|---|---|
| $V_2$ | $V_1$ | | $V_1$ |
| $\rho_2$ | $\rho_1$ | $V_2'$ | $\rho_1$ |
| $W_2$ | $W_1$ | | $W_1$ |

Pore-   resin    Pore   Pore-   resin
forming                forming
substance            substance $$\text{Interconnected hole porosity (\%)} = (1 - V_3/V) \times 100 \quad (1)$$

$$V_3 = V_2' + V_1$$

$$V_2' = (W_3 - W_1)/\rho_2$$

In the above-described equation 1, meanings of each reference symbols are shown below:

V: Volume of molding formed by heating compression molding method before cleaning
ρ: Density of molding formed by heating compression molding method before cleaning
W: Weight of molding formed by heating compression molding method before cleaning
$V_1$: Volume of resinous powder
$\rho_1$: Density of resinous powder
$W_1$: Weight of resinous powder
$V_2$: Volume of pore-forming substance ρ₂: Density of pore-forming substance
W₂: Weight of pore-forming substance
V₃: Volume of resinous porous article after cleaning
W₃: Weight of resinous porous article after cleaning
V'₂: Volume of pore-forming substance remaining in resinous porous article after cleaning In the present invention, by using a producing method described below, the resinous porous article having an interconnected hole porosity not less than 30% and favorably 30% to 90% and more favorably 30% to 70% is obtained.

The resinous porous article which can be used in the present invention is obtained by molding the resin containing the pore-forming substance into the molding, thereafter extracting the pore-forming substance from the molding with the solvent does not dissolve the resin. For example, after a resin A which is molded at X° C. is mixed with a water-soluble powder B having a melting point Y° C. higher than X° C. to obtain a molding by molding a mixture at X° C., the water-soluble powder B is extracted from the molding with water. Thereby the resinous porous article is formed.

The method of producing the resinous porous article is not limited to the above-described method, but a desired method providing the interconnected hole porosity not less than 30% can be adopted. For example, Spinodal decomposing method of extracting one of two separated resin layers consisting of a polymer alloy with a solvent is known.

An example of the method of the present invention of producing the resinous porous article is described with reference to FIG. 1. FIG. 1 is a flowchart of the producing step.

In a solvent in which a pore-forming substance dissolves, resinous powder insoluble in the solvent is dispersed (S1). The dispersion and mixing is performed until the pore-forming substance dissolves completely. In the above-described step, a dispersion solution 1 of the liquid solvent in which the pore-forming substance dissolves and the resinous powder disperses is formed.

As the solvent which is used in the dispersing step, solvents not dissolving the resinous powder therein but dissolves only the pore-forming substance therein can be used. It is possible to use water and solvents compatible with water, for example, an alcohol solvent, an ester solvent, and a ketone solvent. These solvents are appropriately selected according to the kind of the resinous powder, that of the pore-forming substance, and the above-described condition. These solvents are used singly or by mixing not less than two kinds thereof with each other. It is preferable to use water, because processing of waste water can be performed easily and at a low cost.

Thereafter the liquid solvent is removed (S2) from the dispersion solution 1 obtained in the above-described step (S1). In the above-described step, a mixture 2 of the powdery pore-forming substance whose particle diameter is uniform and the resinous powder is obtained. By completely removing the liquid solvent, the mixture 2 becomes a powdery solid matter.

As the method of removing the liquid solvent from the dispersion solution 1, it is possible to use a heating evaporation method, a vacuum evaporation method, a bubbling method to be carried out by using nitrogen gas, a dialyzing method, and a freeze-drying method. It is preferable to remove the liquid solvent by the heating evaporation method because this method can be easily carried out, and equipment for carrying out this method is inexpensive.

As the heating evaporation method, it is preferable to put the dispersion solution in a container and supply the container to a constant-temperature bath when there is no fear that the dispersion solution does not separate. When there is a fear that the dispersion solution separates, it is preferable to use a method of heating the dispersion solution while it is being stirred. A stirring apparatus having a submerged mixer provided with a heater and a stirring apparatus having a mixer installed in the constant-temperature bath are preferable.

The mixture 2 obtained by removing the liquid solvent from the dispersion solution in the step (S2) is molded in conformity to a use and a configuration (S3). In the step (S3), a molding 3 containing the pore-forming substance is obtained.

Regarding the molding method, it is possible to adopt a compression molding method, an injection molding method, an extrusion molding method, a blow molding method, a vacuum molding method, and a transfer molding method.

To improve workability before performing a molding work, the mixture 2 may be processed into a pellet or a prepreg.

The molding obtained in the above-described step (S3) is washed with the solvent which dissolves the pore-forming substance therein to thereby remove the powdery pore-forming substance contained in the molding (S4). In the above-described step, a resinous porous article 4 having pores formed at a portion where the pore-forming substance has been present. When the powdery pore-forming substance is water-soluble, a method of immersing it in hot water having a temperature of 80° C. for 10 hours is used.

As the solvent which is used in the step of removing the pore-forming substance, it is possible to use solvents not dissolving the resinous powder therein but dissolve only the pore-forming substance therein. It is possible to use water and solvents compatible with water, for example, an alcohol solvent, an ester solvent, and a ketone solvent. In the step of removing the pore-forming substance, it is preferable to use the same kind of a solvent as that used in the dispersion step to reduce the cost. It is preferable to use water, because processing of waste water can be performed easily and at a low cost.

In cleaning the molding with the liquid solvent, it is preferable to heat the liquid solvent, mix a plurality of liquid solvents with each other or add a surface active agent because these methods allow the liquid solvent to have a high affinity for the pore-forming substance and cleaning performance to be improved. It is possible to accomplish dissolving and washing in a short period of time by vibrating the liquid solvent by a supersonic cleaner.

As resins usable in the present invention, it is possible to use resinous powder and a pellet of thermoplastic resin, thermosetting resin, elastomer or rubber. When the resinous powder and the pellet are molded by fusing them, they are kneaded together with the pore-forming substance. Therefore the particle diameter and configuration of the resinous powder and the pellet are not specifically limited. When they are dry-blended and molded by compressing them, those having diameters of 1 to 500 µm are preferable.

As the thermoplastic resin or the thermosetting resin, it is possible to list polyethylene resin such as low-density polyethylene, high-density polyethylene, ultra-high-molecular-weight polyethylene; modified polyethylene resin, water-bridged polyolefin resin, polyamide resin, aromatic polyamide resin, polystyrene resin, polypropylene resin, silicone resin, urethane resin, polytetrafluoroethylene resin, chlorotrifluoroethylene resin, tetrafluoroethylene-hexafluoropropylene copolymer resin, tetrafluoroethylene-perfluoroalkyl vinyl ether copolymer resin, vinylidene fluoride resin, ethylene-tetrafluoroethylene copolymer resin, polyacetal resin, polyethylene terephthalate resin, polybutylene terephthalate resin, polyphenylene ether resin, polycarbonate resin, aliphatic polyketone resin, polyvinyl pyrrolidone resin, polyoxazoline resin, polyphenylene sulfide resin, polyether sulfone resin, polyether imide resin, polyamide imide resin, polyether ether ketone resin, thermoplastic polyimide resin, thermosetting polyimide resin, epoxy resin, phenol resin, unsaturated polyester resin, vinyl ester resin. It is also possible to exemplify mixtures, namely, polymer alloys each consisting of not less than two kinds of the above-described synthetic resins.

Of the above-described resins, those applicable to an industrial use such as parts of cars, mechanical parts, electric and electronic parts are preferable. The following resins are preferable: engineering resin having a tensile strength not less than 49 MPa, a bending modulus of elasticity not less than 1.9 GPa, and a heat resistance (thermal deformation temperature: 18.6 kg/cm$^2$) not less than 100° C.; special engineering resin or super-engineering resin which has a higher heat resistance than the above-described engineering resin and can be used for a long time at a temperature higher than 150° C.; and resin which is particularly excellent in its mechanical properties such as its sliding property or in its thermal properties and is thus applicable to the industrial use.

As examples of resins that can be used in the present invention, polyether ether ketone resin, polyphenylene sulfide resin, polyamide imide resin, thermoplastic polyimide resin, thermosetting polyimide resin, polyamide 9T resin, epoxy resin, polytetrafluoroethylene resin, tetrafluoroethylene-perfluoroalkyl vinyl ether copolymer resin, unsaturated polyester resin, and ultra-high-molecular-weight polyethylene are listed.

As the elastomer or the rubber, it is possible to exemplify vulcanized rubbers such as acrylonitrile butadiene rubber, isoprene rubber, styrene rubber, butadiene rubber, nitrile rubber, chloroprene rubber, butyl rubber, acrylic rubber, silicone rubber, fluororubber, ethylene propylene rubber, chlorosulfonated polyethylene rubber, chlorinated polyethylene rubber, and epichlorohidrin rubber; and thermoplastic elastomers such as polyurethane elastomer, polyester elastomer, polyamide elastomer, polybutadiene elastomer, and soft nylon elastomer.

The pore-forming substance usable in the present invention is added to a resin to mold a mixture of the pore-forming substance and the resin into a molding, and extracted from the resinous article with a solvent not dissolving the resin therein.

It is preferable that the pore-forming substance consists of an inorganic salt compound, an organic salt compound or a mixture of these compounds. A water-soluble substance which makes it easy to perform the cleaning extraction step is preferable. An alkali substance is favorable. A weak alkali substance that can be used as a rust preventive agent is more favorable.

As water-soluble pore-forming substances, it is possible to list sodium chloride, ammonium chloride, sodium sulfate, sodium nitrate, potassium sulfate, magnesium sulfate, calcium chloride, and thiourea.

As the pore-forming substance, weak alkali salts which can be utilized as a rust preventive agent can be preferably used. As the weak alkali salts, organic alkali metal salts, organic alkali earth metal salts, inorganic alkali metal salts, and inorganic alkali earth metal salts are listed. It is preferable to use the organic alkali metal salts and organic alkali earth metal salts because these salts are soft and hardly damage a rolling surface and a sliding surface, even when an unextracted portion of the pore-forming substance drops. These metal salts can be used singly or by mixing not less than two kinds thereof with each other. It is preferable to use water-soluble weak alkali salts because they allow the use of inexpensive water as a solvent for cleaning use and facilitate processing of waste water in forming the interconnected hole.

To prevent dissolving of the pore-forming substance at a molding time, as the pore-forming substance, it is preferable to use a substance having a melting point higher than a temperature at which the resin to be used is molded.

As water-soluble organic alkali metal salts that can be preferably used in the present invention, it is possible to list sodium benzoate (melting point: 430° C.), sodium acetate (melting point: 320° C.), sodium sebacate (melting point: 340° C.), sodium succinate, sodium stearate. The sodium benzoate, the sodium acetate, and the sodium sebacate are especially preferable because they have a high melting point respectively, are compatible with many kinds of resins and have high water solubility.

As the organic alkali metal salt, sodium molybdenum, potassium molybdenum, sodium tungstate, sodium triphosphate, sodium pyrophosphate, and potassium carbonate are listed.

The pore-forming substance can be used as a mixture of a substance having a melting point higher than temperatures at which the above-described resins are molded and a substance having a melting point lower than the temperatures at which the above-described resins are molded.

As the substance having a melting point lower than the temperatures at which the above-described resins are molded, pentaerythritol, boric acid (171° C.), and the like are listed.

An average particle diameter of the pore-forming substance is controlled according to a use of the resinous porous article. When the resinous porous article is used as an oil-retaining article, the pore-forming substance having an average particle diameter of 1 to 500 μm is preferable.

In producing a mixture of the pore-forming substance and the resinous powder by dispersing the resinous powder which does not dissolve in a solvent in which the pore-forming substance dissolves and thereafter removing the solvent to obtain a homogeneous resinous porous article having the interconnected holes which are substantially constant in diameters and distributed substantially uniformly in producing the resinous porous article of the present invention, an average particle diameter of the pore-forming substance and its configuration are not specifically limited, when the solubility of the pore-forming substance in the solvent is sufficient. It is preferable to use the above-described water-soluble substances as the pore-forming substance, because the use of the water-soluble substances allows inexpensive water to be used as a solvent for dissolving or washing use and facilitates processing of waste water in a pore-forming time.

The ratio of the pore-forming substance to the total amount of the resinous powder, the pore-forming substance, and other components including a filler is 30 vol % to 90 vol % and favorably 40 vol % to 90 vol %. If the ratio of the pore-forming substance is less than 30 vol %, it is difficult for pores of the resinous porous article to be interconnected. If the ratio of the pore-forming substance is more than 90 vol %, a desired mechanical strength cannot be obtained.

At the mixing time, a filler insoluble in the solvent which is used to extract the pore-forming substance may be used. For example, when water is used as the solvent, glass fiber, carbon fiber or the like may be added to the resin to improve the mechanical strength of the resinous porous article.

The method of mixing the resinous article and the pore-forming substance with each other is not specifically limited, but kneading methods such as dry blend, a fusing kneading method, and the like generally used are applicable.

Further as in the case of a producing method shown in FIG. 1, it is possible to use a method of dissolving the pore-forming substance in the liquid solvent to obtain a transparent solution, dispersing the resinous powder in the transparent solution, and thereafter removing the liquid solvent.

The method of dispersing and mixing the resinous powder is not specifically limited, provided that the mixing can be accomplished in the solution, but it is possible to use a ball mill, an ultrasonic dispersing machine, a homogenizer, a juicer mixer, a Henschel mixer, and the like. To restrain the separation of the dispersion solution, addition of a small amount of a surface active agent is effective. In mixing the resin with the transparent solution in which the pore-forming substance dissolves, the amount of the solvent should be secured to completely dissolve the pore-forming substance by the mixing.

In this case, as the method of removing the solvent, it is possible to use a heating evaporation method, a vacuum evaporation method, a bubbling method to be carried out by using nitrogen gas, a dialyzing method, and a freeze-drying method. It is preferable to remove the liquid solvent by the heating evaporation method, because this method can be easily carried out, and equipment for carrying out this method is inexpensive.

In molding the mixture of the resin and the pore-forming substance, it is possible to adopt any desired molding methods such as a compression molding method, an injection molding method, an extrusion molding, a blow molding method, a vacuum molding method, a transfer molding method, and the like. To improve workability before performing a molding operation, the mixture may be processed into a pellet or a prepreg.

The pore-forming substance is extracted from the obtained molding by dissolving the pore-forming substance and washing the molding with the solvent not dissolving the above-described resin therein.

As the above-described solvent, it is possible to use water and solvents compatible with water, for example, an alcohol solvent, an ester solvent, and a ketone solvent. These solvents are appropriately selected according to the kind of the resin and the pore-forming substance and the above-described condition. These solvents may be used singly or by mixing not less than two kinds thereof with each other. It is preferable to use water, because processing of waste water can be performed easily and at a low cost.

By performing the above-described extraction processing, the resinous porous article in which the interconnected holes are formed at portions where the pore-forming substance has been filled is obtained.

A resinous oil-retaining article is obtained by impregnating the above-described resinous porous article with the lubricating oil or the like. By using the organic alkali metal salt or the like as the alkali pore-forming substance, the resinous porous article can be preferably utilized as parts around which iron and iron and steel are present, even though the pore-forming substance is not completely dissolved and extracted. This is because the pore-forming substance acts as a rust preventive agent.

Not less than 60% of the whole amount of the lubricating oil which has impregnated the resinous porous article is capable of bleeding out to the surface of the resinous oil-retaining article and can be utilized as the lubricating oil on a sliding surface.

Because in the resinous oil-retaining article of the present invention, the interconnected hole retaining the lubricating oil has an interconnected hole porosity not less than 30%, the resinous oil-retaining article is excellent in its oil impregnation allowance. Further because the resinous oil-retaining article has the interconnected hole communicating with the surface of the oil-retaining article, not less than 60% of the whole amount of the lubricating oil is capable of bleeding. Thus the resinous oil-retaining article provides lubricating performance for a long time. The bleeding speed is different according to a use of the resinous oil-retaining article and a use condition thereof.

The kind of the lubricating oil which impregnates the resinous porous article is not specifically limited, but it is possible to list mineral oil (paraffin, naphthene) and synthetic lubricating oil (poly-α-olefin (hereinafter referred to as PAO), ester oil, cyclopentane oil, fluorine oil (PFPE), silicone oil, phenyl ether oil). As necessary, additives such as an antioxidant, an extreme-pressure agent, a friction-adjusting agent, and a rust preventive agent may be added to the lubricating oil.

As the impregnating method, a method capable of impregnating the inside of the resinous porous article can be used. A depressurizing impregnation of immersing the resinous porous article in an impregnating bath filled with the lubricating oil and thereafter impregnating the resinous porous article by depressurization is preferable. When silicone oil having a high viscosity is used, the resinous porous article can be impregnated by pressurization. Impregnation may be performed in combination of pressurization and depressurization.

EXAMPLES

Example 1

30.2 g of powder of ultra-high-molecular-weight polyethylene (MIPELON XM220 produced by Mitsui Chemicals Inc., average diameter: 20 µm), 69.8 g of powder of sodium chloride (reagent produced by Wako Pure Chemical Industries, Ltd., average diameter: 500 µm), 200 g of pure water, and 0.1 g of powder of an anionic surface active agent were mixed with one another for 10 minutes in a beaker by using a magnetic stirrer. As a result, a dispersion solution consisting of an aqueous solution of saturated sodium chloride in which the powder of the ultra-high-molecular-weight polyethylene was dispersed was obtained. The dispersion solution was put in a constant-temperature bath having a temperature of 120° C. and dried for 10 hours. The obtained mixed powder of the powder of the ultra-high-molecular-weight polyethylene and the powder of the sodium chloride was molded by a heating compression molding method. The molding was cleaned with hot water having a temperature of 80° C. by using an ultrasonic cleaner to obtain a resinous porous article.

A section of the obtained resinous porous article was measured by a SEM. The average diameter and the particle size distribution were also measured by using an image-processing software (manufactured by SigmaScan Pro: SYSTAT Inc.). The interconnected hole porosity was computed based on the above-described equation (1).

The interconnected hole porosity of the resinous porous article evaluated by the above-described method was 50%. The average diameter of the interconnected holes was 50 µm. The interconnected holes were uniformly distributed and communicated with one another.

Comparison Example 1

30.2 g of the powder of the ultra-high-molecular-weight polyethylene (MIPELON XM220 produced by Mitsui Chemicals Inc.) and 69.8 g of the powder of the sodium chloride (reagent produced by Wako Pure Chemical Industries, Ltd.) were mixed with each other by using a mixer for five minutes without using a solvent. The obtained mixed powder was molded by the heating compression molding method, similarly to the example 1. The molding was cleaned with hot water having a temperature of 80° C. by using the ultrasonic cleaner to obtain a resinous porous article.

Evaluation was made by a method similar to that of the example 1. As a result, the interconnected hole porosity of the resinous porous article was 50%, and the average diameter of the interconnected holes was 500 μm. The interconnected holes were not uniformly distributed and partly not interconnected with one another.

The particle diameter of the powder of the sodium chloride used in the comparison example 1 was 500 μm in average. After a mixing step was carried out by using the mixer, the particle diameter thereof did not change. The diameters of the interconnected holes of the obtained resinous porous article was 500 μm in average. On the other hand, the diameters of the interconnected holes of the resinous porous article obtained in the example 1 was 50 μm in average. This is considered that although the powder of sodium chloride used in the example 1 was the same as that of the comparison example 1, owing to the mixing in water, the powder of sodium chloride dissolved in the water and owing to a rapid drying of the solution at a high temperature of 120° C., the sodium chloride did not grow to large crystals.

Example 2

The powder of the ultra-high-molecular-weight polyethylene (MIPELON XM220 produced by Mitsui Chemicals Inc.) and powder of sodium benzoate (reagent produced by Wako Pure Chemical Industries, Ltd.) were mixed with each other at a volume ratio of 1:1 for five minutes by using the mixer to obtain mixed powder. The obtained mixed powder was molded into a disk having a diameter of φ30×thickness t 5 mm by the heating compression molding method (200° C.×30 minutes). The molding was cleaned with hot water having a temperature of 80° C. by using the ultrasonic cleaner for 10 hours to elute the powder of the sodium benzoate. Thereafter the molding was dried at 100° C. for eight hours to obtain a resinous porous article having an interconnected hole porosity of 43%. Seven vol % of the sodium benzoate did not elute and remained in the resinous porous article.

Example 3

The powder of the ultra-high-molecular-weight polyethylene (MIPELON XM220 produced by Mitsui Chemicals Inc.) and powder of sodium acetate (reagent produced by Wako Pure Chemical Industries, Ltd.) were mixed with each other at a volume ratio of 1:1 for five minutes by using the mixer to obtain mixed powder. The obtained mixed powder was molded into a disk having a diameter of φ30×thickness t 5 mm by the heating compression molding method (200° C.×30 minutes). The molding was cleaned with hot water having a temperature of 80° C. by using the ultrasonic cleaner for 10 hours to elute the powder of the sodium acetate. Thereafter the molding was dried at 100° C. for eight hours to obtain a resinous porous article having an interconnected hole porosity of 44%. Six vol % of the sodium acetate did not elute and remained in the resinous porous article.

Example 4

Powder of ethylene tetrafluoride (M15 produced by DAIKIN INDUSTRIES, LTD.) and the powder of the sodium benzoate (reagent produced by Wako Pure Chemical Industries, Ltd.) were mixed with each other at a volume ratio of 1:1 for five minutes by using the mixer to obtain mixed powder. The obtained mixed powder was molded into a disk having a diameter of φ30×thickness t 5 mm by the heating compression molding method (350° C.×30 minutes). The molding was cleaned with hot water having a temperature of 80° C. by using the ultrasonic cleaner for 10 hours to elute the powder of the sodium benzoate. Thereafter the molding was dried at 100° C. for eight hours to obtain a resinous porous article having an interconnected hole porosity of 48%. Two vol % of the sodium acetate did not elute and remained in the resinous porous article.

Comparison Example 2

The powder of the ultra-high-molecular-weight polyethylene (MIPELON XM220 produced by Mitsui Chemicals Inc.) and the powder of the sodium chloride (reagent produced by Wako Pure Chemical Industries, Ltd.) were mixed with each other at a volume ratio of 1:1 by using the mixer for five minutes to obtain mixed powder. The obtained mixed powder was molded into a disk having a diameter of φ30×thickness t 5 mm by the heating compression molding method (200° C.×30 minutes). The molding was cleaned with hot water having a temperature of 80° C. by using the ultrasonic cleaner for 10 hours to elute the powder of the sodium chloride. Thereafter the molding was dried at 100° C. for eight hours to obtain a resinous porous article having an interconnected hole porosity of 44%. Six vol % of the sodium chloride did not elute and remained in the resinous porous article.

Comparison Example 3

The powder of the ultra-high-molecular-weight polyethylene (MIPELON XM220 produced by Mitsui Chemicals Inc.) and powder of pentaerythritol (melting point: 260° C., alcohols) were mixed with each other at a volume ratio of 1:1 by using the mixer for five minutes to obtain mixed powder. The obtained mixed powder was molded into a disk having a diameter of φ30×thickness t 5 mm by the heating compression molding method (200° C.×30 minutes). The molding was cleaned with hot water having a temperature of 80° C. by using the ultrasonic cleaner for 10 hours to elute the pentaerythritol. Thereafter the molding was dried at 100° C. for eight hours to obtain a resinous porous article having an interconnected hole porosity of 41%. Nine vol % of the pentaerythritol did not elute and remained in the resinous porous article.

Rust Test

Each of the disks prepared in the examples 2 through 4 and the comparison examples 2 and 3 was sandwiched between SPCC steel plates (40×40×t2) to which synthetic lubricating oil PAO (SYNFLUID 801 produced by Nippon Steel Chemical Co., Ltd.) was applied to conduct a rust test in a humidity cabinet test method (49±1° C., relative humidity: not less than 95%) specified in JIS K2246 "Rust preventive oils". Whether rust formed on a mating surface after elapse of 96 hours, 192 hours, and 384 hours was examined. Table 1 shows the results.

TABLE 1

|  | Interconnected hole porosity (%) | Formation of rust | | |
| --- | --- | --- | --- | --- |
| | | 96 h | 192 h | 384 h |
| Example | | | | |
| 2 | 43 | good | good | good |
| 3 | 44 | good | good | good |
| 4 | 48 | good | good | good |
| Comparison Example | | | | |
| 2 | 44 | poor | poor | poor |
| 3 | 41 | good | good | poor |

As shown in table 1, in each of the examples of the present invention, the formation of rust was not found after elapse of 384 hours. On the other hand, in the comparison example 2, the formation of rust was found after elapse of 96 hours. This is considered that owing to the elution of a slight amount of the sodium chloride, the formation of rust was accelerated. The resinous porous articles of the examples had higher rust preventive performance than the resinous porous article of the comparison example 3 which did not have a factor of accelerating the formation of rust. This is considered that the sodium benzoate used as the pore-forming substance acted as a rust preventive agent.

Example 5

The powder of the ultra-high-molecular-weight polyethylene (MIPELON XM220 produced by Mitsui Chemicals Inc.) and the powder of the sodium benzoate (reagent produced by Wako Pure Chemical Industries, Ltd.) were mixed with each other at a volume ratio of 1:1 for five minutes by using the mixer to obtain mixed powder. The obtained mixed powder was molded into a disk having a diameter of φ30×thickness t 5 mm by the heating compression molding method (200° C.×30 minutes). The molding was cleaned for 10 hours with hot water having a temperature of 80° C. by using the ultrasonic cleaner to elute the powder of the sodium benzoate. Thereafter the molding was dried at 100° C. for eight hours to obtain a resinous porous article having an interconnected hole porosity of 43%. Seven vol % of the sodium benzoate did not elute and remained in the resinous porous article. The porous article was allowed to stand in the beaker containing synthetic lubricating oil PAO (SYNFLUID 801 produced by Nippon Steel Chemical Co., Ltd.) and was impregnated with oil in a vacuum bath for 60 minutes. As a result, a resinous oil-retaining article impregnated at 93 vol % with respect to the interconnected hole porosity of 43% and at 40 vol % with respect to the entire resinous oil-retaining article was obtained.

Example 6

Powder of polyphenylene resin (T4AG produced by DAINIPPON INK AND CHEMICALS, Inc., melting point: 280° C.), the powder of the sodium benzoate (reagent produced by Wako Pure Chemical Industries, Ltd., melting point: 430° C.), and the pentaerythritol (reagent produced by Wako Pure Chemical Industries, Ltd., melting point: 260° C.) were mixed with each other at a volume ratio of 2:1:1 for five minutes by using the mixer to obtain mixed powder. The obtained mixed powder was molded into a disk having a diameter of φ30×thickness t 5 mm by the heating compression molding method (320° C.×30 minutes). The molding was cleaned with hot water having a temperature of 80° C. by using the ultrasonic cleaner for 10 hours to elute the sodium benzoate and the pentaerythritol. Thereafter the molding was dried at 100° C. for eight hours to obtain a resinous porous article having an interconnected hole porosity of 49%. One vol % of the sodium benzoate powder did not elute and remained in the resinous porous article. The porous article was allowed to stand in the beaker containing synthetic lubricating oil PAO (SYNFLUID 801 produced by Nippon Steel Chemical Co., Ltd.) and was impregnated with oil in a vacuum bath for 60 minutes. As a result, a resinous oil-retaining article impregnated at 98 vol % with respect to the interconnected hole porosity of 49% and at 48 vol % with respect to the entire resinous oil-retaining article was obtained.

Example 7

The powder of the ultra-high-molecular-weight polyethylene (MIPELON XM220 produced by Mitsui Chemicals Inc.) and the powder of the pentaerythritol (melting point: 260° C., alcohols) were mixed with each other at a volume ratio of 1:1 for five minutes by using the mixer to obtain mixed powder. The obtained mixed powder was molded into a disk having a diameter of φ30×thickness t 5 mm by the heating compression molding method (200° C.×30 minutes). The molding was cleaned with hot water having a temperature of 80° C. for 10 hours by using the ultrasonic cleaner to elute the pentaerythritol. Thereafter the molding was dried at 100° C. for eight hours to obtain a resinous porous article having an interconnected hole porosity of 41%. Nine vol % of the pentaerythritol did not elute and remained in the resinous porous article. The porous article was allowed to stand in the beaker containing synthetic lubricating oil PAO (SYNFLUID 801 produced by Nippon Steel Chemical Co., Ltd.) and was impregnated with oil in a vacuum bath for 60 minutes. As a result, a resinous oil-retaining article impregnated at 93 vol % with respect to the interconnected hole porosity of 41% and at 38 vol % with respect to the entire resinous oil-retaining article was obtained.

Example 8

The powder of the ultra-high-molecular-weight polyethylene (MIPELON XM220 produced by Mitsui Chemicals Inc.) and the powder of the sodium chloride (reagent produced by Wako Pure Chemical Industries, Ltd.) were mixed with each other at a volume ratio of 1:1 for five minutes by using the mixer to obtain mixed powder. The obtained mixed powder was molded into a disk having a diameter of φ30×thickness t 5 mm by the heating compression molding method (200° C.×30 minutes). The molding was cleaned with hot water having a temperature of 80° C. for 10 hours by using the ultrasonic cleaner to elute the powder of the sodium chloride. Thereafter the molding was dried at 100° C. for eight hours to obtain a resinous porous article having an interconnected hole porosity of 46%. Four vol % of the sodium chloride did not elute and remained in the resinous porous article. The porous article was allowed to stand in the beaker containing synthetic lubricating oil PAO (SYNFLUID 801 produced by Nippon Steel Chemical Co., Ltd.) and was impregnated with oil in a vacuum bath for 60 minutes. As a result, a resinous oil-retaining article impregnated at 98 vol % with respect to the interconnected hole porosity of 46% and at 45 vol % with respect to the entire resinous oil-retaining article was obtained.

Comparison Example 4

100 parts by weight of the powder of the ultra-high-molecular-weight polyethylene (MIPELON XM220 produced by Mitsui Chemicals Inc.), 35 parts by weight of grease (Alvania No. 3 produced by SHOWA SHELL SEKIYU K.K.), and 35 parts by weight of oil (DTE Heavy medium produced by Exxon Mobil Corporation) were mixed with one another. A mixture was baked at 150° C. and machined to obtain a disk having a diameter of ϕ30×thickness t 5 mm as a specimen.

Rust Test

Each of the disks prepared in the examples 5 through 8 and the comparison example 4 was sandwiched between SPCC steel plates (40×40×t2) to conduct a rust test in a humidity cabinet test method (49±1° C., relative humidity: not less than 95%) specified in JIS K2246 "Rust preventive oils". Whether rust formed on a mating surface after elapse of 192 hours, 384 hours, and 576 hours was examined. Table 2 shows the results.

Test of Release Amount of Oil

The disk prepared in each of the examples 5 through 8 and the comparison example 4 was pressurized by placing a weight thereon, with the disk sandwiched between two sheets of filter paper. After this state was allowed to stand for 100 hours, the amount of oil which moved to the filter paper was measured. Table 2 shows the ratio of released oil per the whole volume of the specimen.

Wako Pure Chemical Industries, Ltd.) were mixed with each other at a volume ratio of 50:50 for five minutes by using the mixer to obtain mixed powder. The obtained mixed powder was molded into a disk having a diameter of ϕ30×thickness t 5 mm by the heating compression molding method (200° C.×30 minutes). The molding was cleaned with hot water having a temperature of 80° C. for 10 hours by using the ultrasonic cleaner to elute the powder of the sodium benzoate. Thereafter the molding was dried at 100° C. for eight hours to obtain a resinous porous article having an interconnected hole porosity of 48%. The resinous porous article was impregnated with the synthetic lubricating oil PAO (SYNFLUID 801 produced by Nippon Steel Chemical Co., Ltd. (viscosity: 46 mm$^2$/s (40° C.))) in a vacuum bath at 60° C. to obtain a resinous oil-retaining article to be tested. The oil content was 45% with respect to the entire volume. An bleeding test was conducted for the oil-retaining article.

Example 10

The powder of the ethylene tetrafluoride (M15 produced by DAIKIN INDUSTRIES, LTD.) and the powder of the sodium benzoate (reagent produced by Wako Pure Chemical Industries, Ltd.) were mixed with each other at a volume ratio of

TABLE 2

| | | | Resinous oil-retaining material | | | | | |
|---|---|---|---|---|---|---|---|---|
| | Pore-forming substance | | | Oil | | | | |
| | Material | Mixing ratio (wt %) | Interconnected hole porosity (%) | Oil content (vol %) | release amount (vol %) | Formation of rust | | |
| | | | | | | 192 h | 384 h | 576 h |
| Example | | | | | | | | |
| 5 | Powder of sodium benzoate | 50 | 43 | 40 | 20 | good | good | good |
| 6 | Pentaerythritol + powder of sodium benzoate | 50 | 49 | 48 | 15 | good | good | poor |
| 7 | Pentaerythritol | 50 | 44 | 38 | 10 | good | good | poor |
| 8 | Powder of sodium chloride | 50 | 46 | 45 | 30 | poor | poor | poor |
| Comparison Example | | | | | | | | |
| 4 | — | — | — | — | 2 | poor | poor | poor |

As indicated in table 2, it could be confirmed that the disk of each of the examples of the present invention had a sufficient oil-absorbing capability as an oil-retaining article. In the rust test, the formation of rust was not found on the disk of the example 5 after elapse of 576 hours. This is considered that the sodium benzoate used as the pore-forming substance acted as a rust preventive agent.

The resinous oil-retaining article of each example is excellent in its oil releasability and thus has a higher lubricating performance than those of the comparison example 4 containing the grease and the oil. But when the resinous oil-retaining article is used as parts which contact iron and steel, the sodium chloride (example 8) used as the pore-forming substance which corrodes the iron and steel is unpreferable.

Example 9

The powder of the ultra-high-molecular-weight polyethylene (MIPELON XM220 produced by Mitsui Chemicals Inc.) and the powder of the sodium benzoate (reagent produced by 50:50 for five minutes by using the mixer to obtain mixed powder. The obtained mixed powder was molded into a disk having a diameter of ϕ30×thickness t 5 mm by the heating compression molding method (350° C.×30 minutes). The molding was cleaned with hot water having a temperature of 80° C. for 10 hours by using the ultrasonic cleaner to elute the powder of the sodium benzoate. Thereafter the molding was dried at 100° C. for eight hours to obtain a resinous porous article having an interconnected hole porosity of 48%. The resinous porous article was impregnated with synthetic hydrogen carbonate oil (LUCANT HC-20 produced by Mitsui Chemicals Inc. (viscosity: 155 mm$^2$/s (40° C.))) in a vacuum bath at 60° C. to obtain a resinous oil-retaining article to be tested. The oil content was 44% with respect to the entire volume. An bleeding test of the impregnating oil was conducted by using this specimen.

Example 11

Powder of polyether ketone (PEEK) resin (150PF produced by Victrex Inc.), carbon fiber, and the powder of the sodium benzoate (produced by Wako Pure Chemical Industries, Ltd.) were melted and kneaded at a volume ratio of 50:10:40 by using a Brabender to obtain mixed powder. The obtained mixed powder was molded into a disk having a diameter of φ30×thickness t 5 mm by the heating compression molding method (360° C.×30 minutes). The molding was washed with hot water having a temperature of 80° C. for 10 hours by using the ultrasonic cleaner to elute the powder of the sodium benzoate. Thereafter the molding was dried at 100° C. for eight hours to obtain a resinous porous article having an interconnected hole porosity of 39%. The resinous porous article was impregnated with the synthetic lubricating oil PAO (SYNFLUID 801 produced by Nippon Steel Chemical Co., Ltd. (viscosity: 46 mm$^2$/s (40° C.))) in a vacuum bath at 60° C. to obtain a resinous oil-retaining article to be tested. The oil content after the molding operation finished was 38% with respect to the entire volume. An bleeding test of the impregnating oil was conducted by using this specimen.

Comparison Example 5

Figure 2:
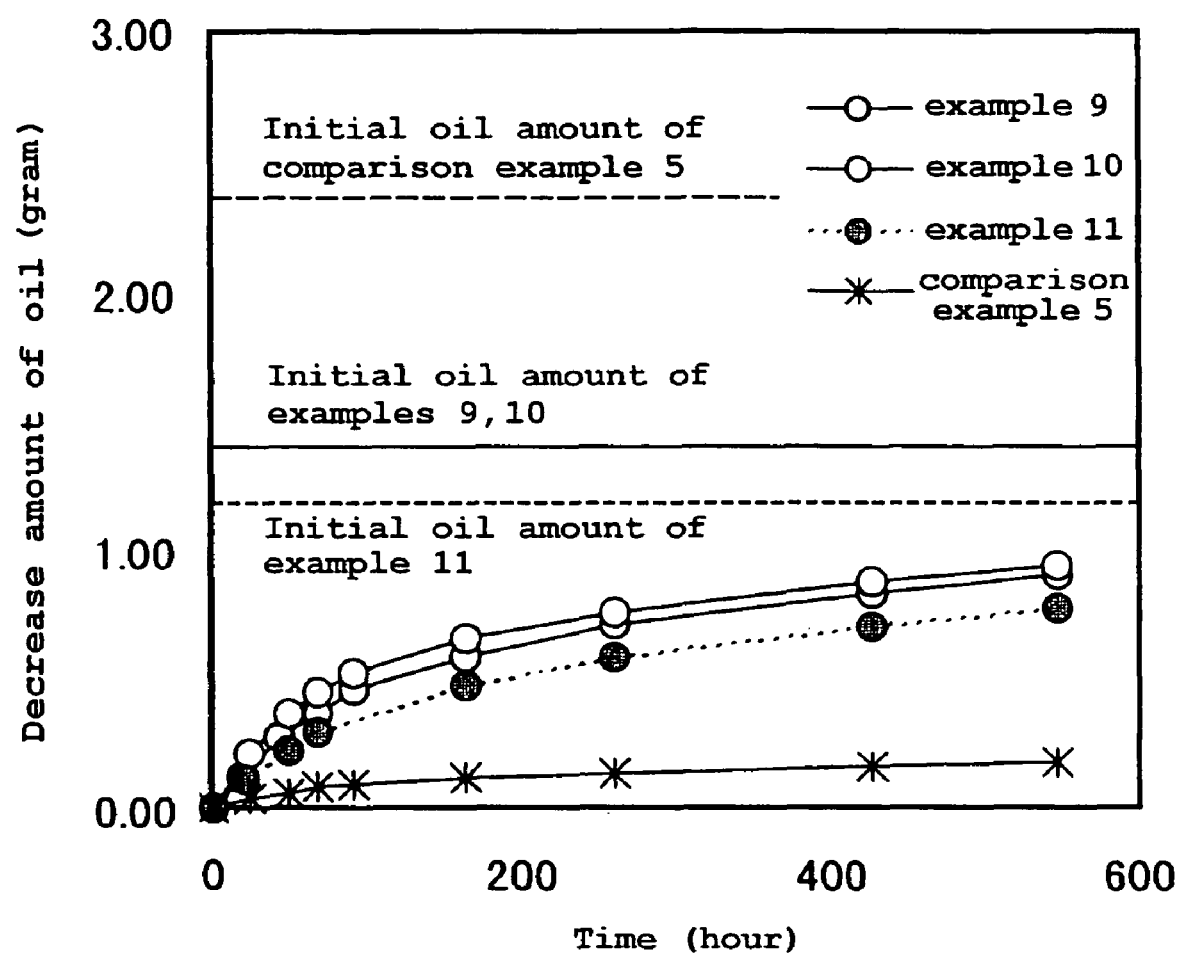
FIG. 2 shows results of an bleeding test of impregnating oil.

The powder of the ultra-high-molecular-weight polyethylene (MIPELON XM220 produced by Mitsui Chemicals Inc.), polyethylene wax (SUNTIGHT S produced by Seiko Chemical Co., Ltd.), and synthetic lubricating oil (PAO) (SYNFLUID 801 produced by Nippon Steel Chemical Co., Ltd. (viscosity: 46 mm$^2$/s (40° C.))) were mixed with each other at a volume ratio of 20:15:65 and put in a die. The mixture was molded into a disk having φ30×thickness t 5 mm by a free sintering method (160° C.×30 minutes). The oil content of the disk after a molding operation finishes was 72% per the entire volume thereof. By using this specimen, an bleeding test of the impregnating oil was conducted.
Bleeding Test of Impregnating Oil The disk prepared in each of the examples 9 through 11 and the comparison example 5 was sandwiched between two sheets of quantitative filter paper No. 5C (φ100 mm) to examine the migration characteristic of the impregnating oil to the quantitative filter paper as the decrease amount of the impregnating oil of the disk. Table 2 shows the results. In FIG. 2, the abscissa axis shows the elapse of time (hour), and the ordinate axis shows the decrease amount of oil (gram (g)).

As shown in table 2, in each example, bleeding was possible at not less than 70% of an initial oil impregnation amount. Although the initial oil impregnation amount of the disk of the comparison example 5 was about twice larger than that of the disk of the example 11, the bleeding amount of the impregnating oil of the disk of the comparison example 5 was about 20% of that of the disk of the example 11. It can be understood that the resinous oil-retaining article of each example had the interconnected hole and is capable of effectively utilizing the impregnating oil.

INDUSTRIAL APPLICABILITY

Because the resinous porous article of the present invention is excellent in its rust preventive performance and durability, it can be preferably used as an article of a rolling bearing, a retainer of a sliding bearing, and the like around which iron and steel are present and as a article of parts demanded to have a long life.

The invention claimed is:
1. A resinous porous article comprising a plurality of resin particles fused to one another and having interconnected holes, wherein said article having interconnected holes is formed by molding the resin particles to cause the resin particles to deform and contact one another, said article further having a pore-forming substance incorporated therein which is an alkali compound, and extracting said pore-forming substance from said molding with a solvent which dissolves said pore-forming substance and does not dissolve said resin particles,
   wherein part of said pore-forming substance remains in said resinous porous article,
   wherein oil is impregnated into said interconnected hole
   wherein said alkali compound is at least one compound selected from among sodium benzoate, sodium acetate, sodium sebacate, sodium triphosphate, sodium pyrophosphate, and potassium carbonate,
   wherein said resin is an engineering resin, a special engineering resin or a super-engineering resin.
2. The resinous porous article according to claim 1, wherein said pore-forming substance has a higher melting point than a temperature at which said resin is molded.
3. The resinous porous article according to claim 1, wherein said pore-forming substance is water-soluble.
4. The resinous porous article according to claim 1, wherein an interconnected hole porosity is not less than 30%.
5. The resinous porous article according to claim 1, wherein said oil consists of a lubricating oil.
6. The resinous porous article according to claim 5, wherein not less than 60% of a total amount of said lubricating oil can be utilized as said lubricating oil.
7. A method of producing a resinous porous article according to claim 1, comprising the steps of: adding a pore-forming substance to a plurality of resin particles; molding said resin particles containing said pore-forming substance into a molding; and extracting said pore-forming substance from said molding with a solvent which dissolves said pore-forming substance and does not dissolve said resin particles.
8. The method of producing a resinous porous article according to claim 7, wherein said step of adding said pore-forming substance to said resin particles includes the step of dispersing resinous particles which does not dissolve in a solvent in which said pore-forming substance dissolves to obtain a dispersion solution; and the step of removing said solvent from said dispersion solution, whereby a mixture of said pore-forming substance and said resinous particles is formed.
9. The method of producing a resinous porous article according to claim 8, wherein said solvent used in said dispersing step is the same as said solvent used in said step of extracting said pore-forming substance.
10. The method of producing a resinous porous article according to claim 8, wherein an average diameter of said pore-forming substance is in a range of 0.001 μm to 100 μm, after said step of removing said solvent finishes.

* * * * *